HIGH-STRENGTH HIGH-DENSITY TUNGSTEN BASE ALLOYS

Original Filed June 26, 1956 6 Sheets-Sheet 1

COMPOSITION LIMITS OF W-Ni-Cu-Mo ALLOYS

INVENTOR
CHOH-YI ANG
BY Nicholas Sauzo
ATTORNEY

HIGH-STRENGTH HIGH-DENSITY TUNGSTEN BASE ALLOYS

Original Filed June 26, 1956 6 Sheets-Sheet 2

COMPOSITION LIMITS OF W-Ni-Cu-Mo-Fe ALLOYS

INVENTOR
CHOH-YI ANG
BY Nicholas Langer
ATTORNEY

HIGH-STRENGTH HIGH-DENSITY TUNGSTEN BASE ALLOYS

Original Filed June 26, 1956 6 Sheets-Sheet 3

INVENTOR
CHOH-YI ANG
BY
ATTORNEY

HIGH-STRENGTH HIGH-DENSITY TUNGSTEN BASE ALLOYS

Original Filed June 26, 1956 6 Sheets-Sheet 4

INVENTOR
CHOH-YI ANG

BY Nicolas Young Jr.
ATTORNEY

HIGH-STRENGTH HIGH-DENSITY TUNGSTEN BASE ALLOYS

Original Filed June 26, 1956 6 Sheets-Sheet 5

INVENTOR
CHOH-YI ANG

BY Nicholas Bugg
ATTORNEY

HIGH-STRENGTH HIGH-DENSITY TUNGSTEN BASE ALLOYS

Original Filed June 26, 1956 6 Sheets-Sheet 6

INVENTOR
CHOH-YI ANG

BY Nicholas Hauger
ATTORNEY

United States Patent Office

Re. 24,674
Reissued July 28, 1959

24,674

HIGH-STRENGTH HIGH-DENSITY TUNGSTEN BASE ALLOYS

Choh-Yi Ang, Indianapolis, Ind., assignor to P. R. Mallory & Co., Inc., Indianapolis, Ind., a corporation of Delaware Original No. 2,843,921, dated July 22, 1958, Serial No. 594,039, June 26, 1956. Application for reissue December 23, 1958, Serial No. 782,613

5 Claims. (Cl. 29—182)

Matter enclosed in heavy brackets [ ] appears in the original patent but forms no part of this reissue specification; matter printed in italics indicates the additions made by reissue.

This invention relates to high-density tungsten base alloys, and more particularly, to tungsten base alloys having improved physical properties, such as greatly increased ultimate tensile strength, which could not be obtained with prior alloys of the same general type.

Heretofore, tungsten base alloys, especially a group of these alloys in which small percentages of nickel and copper were alloyed with the tungsten base, have been used commercially on a substantial scale for applications where their high density and other physical characteristics have been found to be desirable, for example, for radiation shielding, weight balancing, rotors of gyroscopes and gyrocompasses, balance crankshafts of aeromotors, boring bars, tool shanks, and the like. Although these prior tungsten-nickel-copper alloys possessed valuable properties in addition to their high densities, such as the possibility of machining them to final dimensions without grinding or other expensive operations, they had the disadvantage of relatively low strength. Thus, one of the strongest known tungsten-nickel-copper alloys was reported to have a tensile strength of only 112,000 p.s.i. This circumstance has limited the use of these alloys for certain applications, particularly as rotors of gyroscopes and gyrocompasses, where the present trend of development is toward increased rotational speeds requiring higher tensile strength of the structural materials used.

It is an object of the present invention to improve tungsten base alloys.

It is another object of the present invention to provide improved high-density tungsten base alloys characterized by tensile strengths greatly exceeding those obtainable with conventional tungsten base alloys.

It is a further object of the invention to provide high-density tungsten base alloys containing, in addition to the usual alloying metals of nickel and copper, also other metals in critically controlled proportions and which will yield ultimate tensile strengths from 10% to more than 50% greater than those of the heretofore reported tungsten-nickel-copper materials or of their modified alloys.

It is also within the contemplation of the invention to provide a novel method for the commercial production of high-density tungsten base alloys of high strength.

The invention also contemplates a novel and improved group of high-density tungsten base alloys which, as to the cost of the initial materials and production, are not more expensive than present tungsten base alloys for similar applications, wihch are characterized by ultimate tensile strengths which were hereto unobtainable in the present tungsten base alloys, and which may be readily manufactured and sold on a practical and commercial scale at a low cost.

Other and further objects and advantages of the present invention will become apparent from the following description, taken in conjunction with the accompanying drawings, in which.

Figure 1:
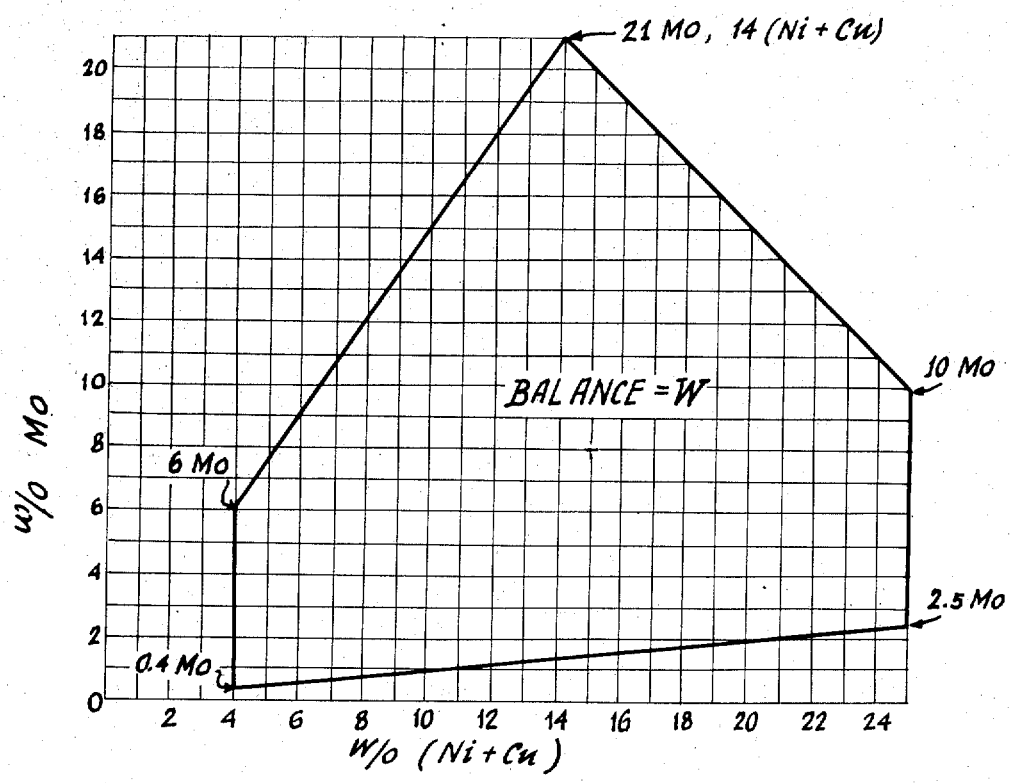
Fig. 1 is a graph indicating the composition limits of a group of tungsten base alloys embodying the invention.

Broadly stated, the present invention is based on the discovery that high-density alloys of heretofore unobtainable strength and other characteristics may be obtained by alloying tungsten with minor proportions of copper, nickel and molybdenum, or of copper, nickel, molybdenum and iron. The alloys within the contemplation of the invention contain as least 65% by weight of tungsten and various amounts of nickel, copper, molybdenum and iron in controlled and correlated proportions as minor constituents, the function of which is to form a strong alloy matrix surrounding the tungsten or tungsten and molybdenum grains, imparting to the alloy as a whole under controlled conditions ultimate tensile strengths much greater than those of the conventional high-density tungsten alloys to as high as that of well annealed pure tungsten. I have found that with specific powder characteristics and under controlled sintering conditions the mechanical properties of the sintered alloys of the invention may be varied within wide limts; thus, ultimate tensile strengths from 100,000 p.s.i. to greater than 160,000 p.s.i., and ductilities from a fraction of 1% to greater than 9% in one inch may be readily obtained. For the purposes of the present description, the term "high-density alloy" is intended to mean alloys which have theoretical densities not less than 13.5 gm./cc. and sintered densities at least 93% of the theoretical, that is, approximately 12.6 gm./cc.

I am aware of the fact that it was already previously attempted to form alloys containing molybdenum in addition to tungsten, nickel and copper. However, these prior alloys have been either molybdenum-base alloys containing tungsten, nickel and copper only as minor constituents, or have employed molybdenum merely to replace some or most of the tungsten, thereby to obtain alloys of lower density. In contrast to this, in accordance with the principles of the present invention, the molybdenum is not added as a "density diluting agent" but is adjusted in critically controlled amounts with respect to the nickel and copper contents. As a result, the alloys of the invention, when given a proper length of additional sintering time at temperature after adequate densification has been achieved, will have, upon cooling, between tungsten, or tungsten and molybdenum grains, a binding material, which is a Ni-Cu-Mo or Ni-Cu-Mo-W complex phase, or a Ni-Cu phase containing Mo and W in solid solution, or a complex alloy phase containing minute precipitates of the refractory elements or other alloy phases. In any case, this matrix is strengthened by the molybdenum addition and by the controlled sintering treatments to a degree that several compositions of the inventions under certain conditions will yield ultimate tensile strengths approaching or equal to that of well-annealed pure tungsten.

In the case of the second series of the tungsten base alloys of the invention comprising nickel, copper, molybdenum and iron, further novel and unique results are obtained. Thus, in the presence of molybdenum, the addition of iron in calculated amounts with respect to the nickel and copper contents also functions as a matrix-strengthening agent. The addition of iron in limited but sufficient quantities not only improves under given conditions the ductility of the alloys without jeopardizing their high tensile strengths, but also raises the degree of response of these alloys to sintering treatments so that additional desirable mechanical properties may be obtained.

The alloys of the invention may be made by powder metallurgical methods. The uniformly and intimately mixed, preferably partially or totally pre-alloyed, powders of the desired constituents, having a suitable average particle size (as measured with a Fisher sub sieve sizer) not greater than 8 microns, preferably between 2 and 6 microns, with a normal particle size distribution, with or without a binder, are formed under pressure into coherent bodies and subsequently sintered in a protective or reducing atmosphere at suitable temperatures. The sintering temperatures must not be lower than the liquidus temperature of the theoretical binary Ni-Cu phase and the sintering time must not be shorter than that required at the selected temperature to produce a sintered density at least 93% of the theoretical. As a function of the average particle size of the prepared powder and the sintering temperature, for a given composition, the sintering time after the minimum densification period may be varied to obtain desired mechanical properties of the sintered alloy.

In making the alloys of the invention, rather than starting out from powders of the elementary metals, it is generally preferred to mix the oxides or other readily reducible compounds of the constituents metals in powder form, co-reducing the mixture of metal compounds, for example, by heating under reducing conditions, to a mixture or partial alloy of the elementary metals, and further treating the reduced metal or partially alloyed powder by powder metallurgical procedures.

The invention will now be more fully described with particular reference to the accompanying drawings.

COMPOSITION LIMITS

The invention is directed to improvements in heavy, or high-density, alloys, which for the purposes of the present description are defined as alloys having a minimum theoretical density of 13.5 gm./cc. and a minimum sintered density equal to 93% of the theoretical. Calculation of the theoretical densities is based on the following densities of the individual components.

| | Gm./cc. |
|---|---|
| Tungsten | 19.32 |
| Nickel | 8.9 |
| Copper | 8.92 |
| Molybdenum | 10.2 |
| Iron | 7.87 |

The invention contemplates alloys within the following ranges, it being noted that throughout the description all percentages are intended to mean percentages by weight (w/o):

(1) W ..... At least 65%.
(2) Ni+Cu+Mo+Fe ..... Not over 35%.
(3) Ni+Cu ..... 4% to 25%.
(4) [Ni+Cu] *Ni/Cu* ratio 0.5 to 2.5
(5) Mo ..... [0.4] *0.1* (Ni+Cu)% to 1.5 (Ni+Cu)%.
(6) Fe ..... 0 to 1.5 (Ni+Cu)% but not over 10%.

Figure 2:
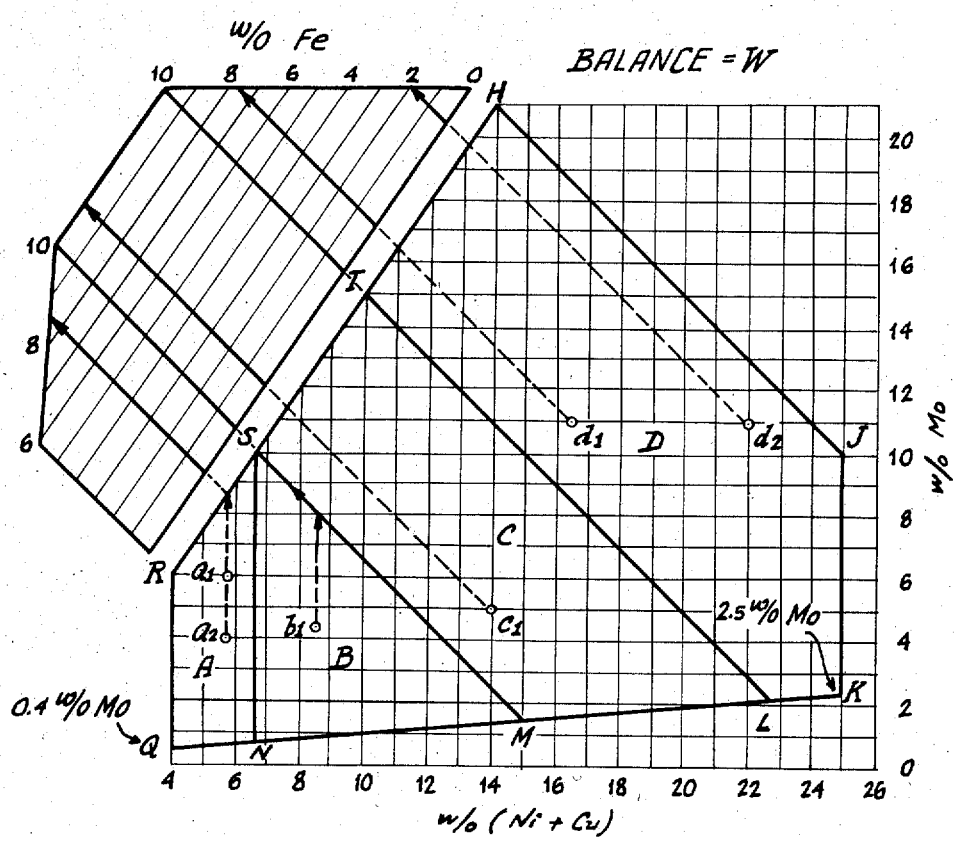
Fig. 2 is a similar graph indicating the composition limits of another group of tungsten base alloys of the invention.

For clearer understanding of these alloy ranges, reference may be had to Figs. 1 and 2 of the drawing, of which Fig. 1 illustrates the composition ranges of the first series of alloys composed of W-Ni-Cu-Mo and Fig. 2 illustrates the composition ranges of the second series of alloys composed of W-Ni-Cu-Mo-Fe. It will be noted that by equating Fe with zero, Fig. 2 becomes identical with Fig. 1.

Considering first Fig. 1, the application of this graph to determine the ranges covered by the first series of alloys is self-evident. As to the second series of alloys shown in Fig. 2, all of the alloys contemplated by the present invention are represented by the area QRHJK, with the aid of the smaller enclosure in the upper left corner. Here, a little extrapolation is required to identify a particular alloy composition. According to condition (6), the Fe content may approach 0%, therefore, the Ni+Cu+Mo contents (W the balance) may be first plotted in the area QRHJK, and then the Fe content is located in the upper left enclosure by graphic extrapolation from the plotted point within QRHJK. The method of graphic extrapolation is quite simple and becomes readily understandable from the following:

1. Area A (QRSN)

The maximum Fe contents in the compositions enclosed by this area may vary from 6% to 10% depending on its location in the area in terms of Ni+Cu and Mo contents. For example, partial composition $a_1$ (5.7% (Ni+Cu), 6% Mo, balance W) or $a_2$ (5.7% (Ni+Cu), 4% Mo, balance W) may represent a large number of alloys containing Fe from 0% to 8.5%. Graphically, this is shown by drawing a line from either $a_1$ or $a_2$, perpendicular to the abscissa (or parallel to line SN), until it intersects line RS. From this point of intersection, another line is drawn parallel to SM until it meets the left boundary line of the upper left enclosure. This terminal point is 8.5% Fe; therefore, alloys containing 0% to 8.5% Fe plus Ni, Cu, Mo and W in amounts indicated by $a_1$ and $a_2$ are all within contemplation of the invention.

2. Area B (NSM)

All compositions may contain 0% to 10% Fe. Graphically, this may be presented by a line drawn from any partial Ni-Cu-Mo composition, for example $b_1$, perpendicular to the abscissa, to line SM. The continuation of SM terminates at 10% Fe maximum.

3. Area C (MSTL)

All compositions may contain 0% to 10% Fe. The method of graphic extrapolation is self-evident, as shown by the example given in Fig. 2, i. e., $c_1$ alloy.

4. Area D (LTHJKL)

Graphic extrapolation is the same as for area C. However, the alloys in area D may have their maximum Fe contents varying from 10% to 0% as a function of their Mo and Ni+Cu contents. For example, $d_1$ with 11% Mo and 16.5% (Ni+Cu) may contain up to 7.5% Fe, whereas $d_2$ with the same amount of Mo but 22% for Ni+Cu can contain no more than 2% Fe.

CONSIDERATIONS RELATING TO COMPOSITION RATIOS AND LIMITS

1. Tungsten and the density limits

The lower limit of 65% for W is specified because, under present commercial practice, for applications which require high-density or "heavy" materials, a density of 12.5 gm./cc. (93% of a theoretical density of 13.5 gm/cc.), or higher, is considered as "heavy."

2. Ni+Cu limits and Ni/Cu ratios

In a tungsten alloy of the type contemplated by the invention, Ni and Cu are essential to give a liquid phase at commercially feasible sintering temperatures and to promote the solution and precipitation of the refractory elements, W or W and Mo. When Ni+Cu is less than 4%, the powder compact has difficulty in attaining high sintered density *due* to deficiency in liquid phase. The powder is also difficult to press, resulting in pressure cracks.

Ni+Cu greater than 25% will cause the presence of too much liquid phase during sintering, which makes sintering very difficult to control. Experimental investigation has indicated that unless the other components (Mo, Fe and W) were present in certain specific amounts, Ni+Cu contents higher than 25% resulted in weaker alloys.

Ni/Cu ratios are important because: (a) when Ni is more than 2.5 times Cu, the sintering temperature will have to be very high to effect the solution and precipitation of W or W and Mo; (b) when Cu is more than twice the Ni (or Ni/Cu is less than 0.5), the formation temperature of the liquid phase is low, and at low sintering temperatures (for example, in the range of 1100° to 1300° C.), the solution and precipitation of W or W and Mo are difficult to achieve. Using a higher sintering temperature under these conditions will result in all kinds of trouble, such as warting, blistering, or shape distortion.

3. Mo and Fe contents

These two elements do not contribute much to the formation of a liquid phase, although Mo-Ni does have an eutectic composition which melts at 1300° C.

There are no Mo-Ni-Fe, W-Mo-Ni-Cu, or Mo-Ni-Cu constitutional diagrams available in the literature, but we may think in terms of Mo-Ni and Mo-Fe and Fe-Ni systems. A Mo content exceeding the maximum of 1.5 times Ni+Cu (or more than 2 times Ni if maximum Ni is present in Ni+Cu), puts the binary Mo-Ni in a high melting phase where diffusion rates of all elements concerned are slow. This is strongly indicated by experimental evidence.

The addition of Fe to the Ni-Cu system will strengthen the alloy phase to a certain extent. Since in the second series of alloys, Fe is added only when Mo is present in order to have high strength properties, the Mo-Fe system then plays a part which may be important. If the Mo content is greater than the Fe content, the binary phases are epsilon and delta, which inherit more properties from Mo than from Fe. When the Fe is more than the Mo, the ductility of the alpha phase (high Fe) shows up until too much Fe is added, then the alloy loses strength. Therefore, maximum Fe is specified as the same as maximum Mo (1.5 times Ni+Cu), but not more than 10%. Experiment showed that too much Fe did weaken the alloy, although the ductility was improved. Furthermore, the density limits imposed by practical considerations also restrict the amounts of Fe addition due to the fact that Fe is a light element having a density of only 7.87 gm./cc.

From the foregoing conisderations, it appears that both Mo and Fe play important roles in strengthening W-Ni-Cu alloys. Their function consists of any one or all of the following:

a. They strengthen the matrix by going into solid solutions.

b. They, when in the form of very minute (submicroscopic) precipitates in the matrix, strengthen the alloy.

c. They slow down the rate of precipitation of W from the matrix when the latter is already in solution, thus strengthening the alloy.

This explanation of the strengthening phenomena also clarifies why the properties of the alloys of the invention drop to those of conventional W-Cu-Ni alloys after excessively long sintering. Unduly long sintering precipitates out W or high W and high Mo phases, accompanied, of course, by grain growth, leaving the matrix essentially comprising Ni and Cu. If Fe plays a role of precipitation hardening, the long time sintering may develop some phenomena equivalent to high temperature over-aging, which results in a softer alloy.

The addition of Fe to W-Ni-Cu-Mo in limited amounts not only improves ductility without reducing the strength, but also makes the control of the sintering operation less difficult. This is probably due to the control of particle size of the powder during powder preparation. In the presence of the oxides of Fe and Mo, the co-reduction of the mixture of all oxides can be easily controlled to give an average particle in the preferred range of 2 to 6 microns. Too small a particle size is not only hard to handle, but also makes it difficult to "arrest" the sintered alloy in the correct conditions which give high strength properties. In other words, due to so large a total active surface area, the action of solution and precipitation takes place so rapidly that strengthening phenomena occur as soon as the compact densifies, and disappear very soon after densification. Excessively large particle size, on the other hand, makes it difficult to densify the compact. When a very long sintering is used to achieve densification, the alloy is already in the "soft" state.

ACTUAL POWDER PREPARATION

In making the alloys of the invention by powder metallurgical procedures, it is preferred to start out from oxides of the component metals, rather than from powders of the elementary metals. Co-reduction of those oxides is used to prepare the "pre-alloyed" powders, the average particle size of which should not exceed 8 microns and preferably should be between 2 and 6 microns. Oxides of W, Ni, Cu, Mo and Fe are thoroughly blended together and then reduced at 900° to 1100° C. in dry cracked ammonia or hydrogen atmosphere. Particle size of the resulting powder is controlled by varying reduction time and temperature and bed thickness.

The average particle size of typical oxide materials suitable for the purposes of the present invention will appear from the following:

| | |
|---|---|
| Molybdic oxide | Very fine, difficult to measure. |
| Blue tungstic oxide | 11–17 microns. |
| Magnetite | 2.3 microns. |
| Nickel oxide | Approximately 3 microns. |
| Cuprous oxide | Approximately 3 microns. |

In general, pre-alloyed powders having the desired average particle size within 2 to 6 microns were obtained by loading the thoroughly blended oxide materials having the above characteristics in stainless steel trays with a bed thickness of about 3/16" and co-reducing them at 900–1000° C. for a time, at heat, of one-half to three-quarters of an hour in dry cracked ammonia atmosphere. In a heat zone of approximately 2" x 8" x 24" with a load of not more than 2 kilos of material, the gas flow was about 340 cubic feet per hour. If the particle sizes of the oxides were different from the ones listed in the foregoing, the desired average particle size of 2 to 6 microns may [b] *be* obtained by appropriately varying the conditions under which the co-reduction process is carried out. This may be accomplished by several methods which employ one or more of the following principles:

a. Thinner bed reduces particle size.

b. Lower reduction temperature reduces particle size.

c. Shorter reduction time reduces particle size.

d. More gas flow slightly reduces particle size.

PRESSING THE POWDERS

Pressing of the co-reduced and at least partially pre-alloyed powders having an average particle size not exceeding 8 microns and preferably within the range of 2 to 6 microns, may be carried out with or without admixture of a binder, such as glyptal. Conventional equipment may be used, such as a hydraulic press capable of exerting both top and bottom pressures simultaneously. Pressing to a green density of 50% to 70% of the theoretical density requires only pressures between 10 to 30 tons per square inch. Under these conditions, the green strength of the compacts is very good and no pressure cracks are evident.

SINTERING

Sintering is carried out in a reducing atmosphere at temperatures which may be between 1350° and 1500° C., preferably between 1400° and 1440° C. The sintering time may vary between 4 to 60 minutes, good results being obtained by sintering for a period between 4 to 20 minutes, keeping in mind that very long sintering times are undesirable. The optimum sintering temperatures and times, of course, depend on the particular composition and also on the mechanical properties that are to be obtained, and can be readily determined in each case by making a few test bars under different sintering conditions.

Figure 3:
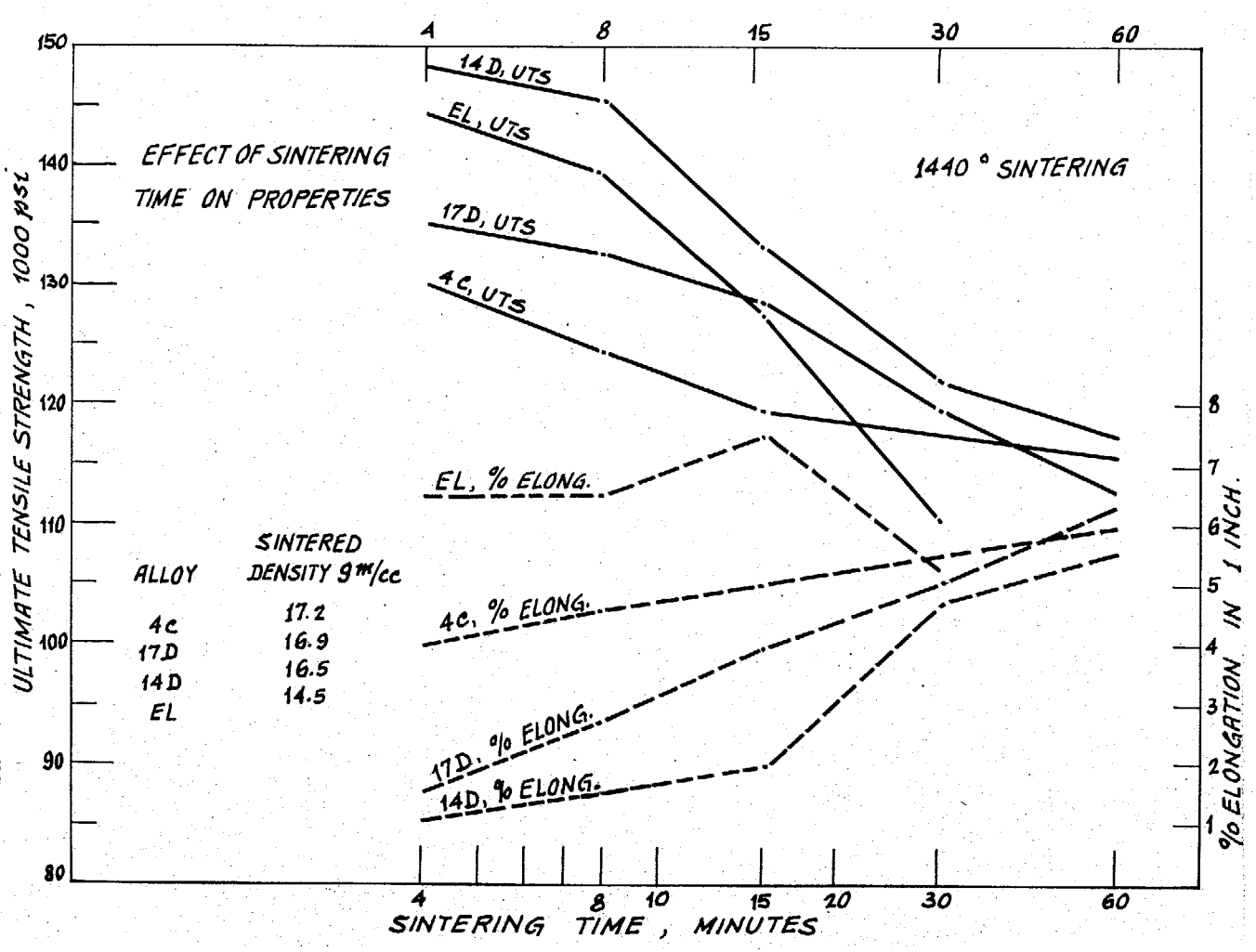
Fig. 3 is a graph showing the effect of sintering time on the physical properties of the alloys embodying the invention.
Figure 4:
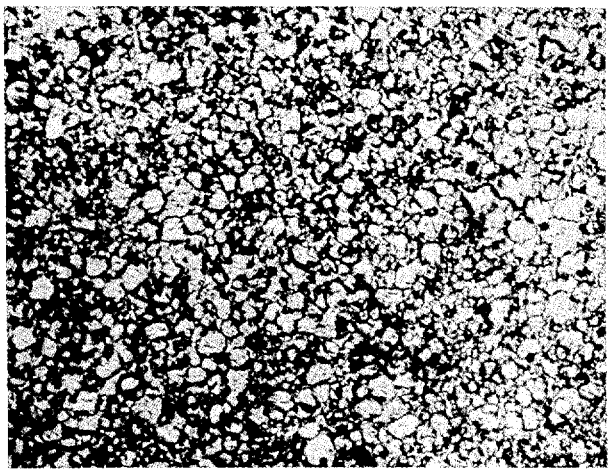
Figs. 4 to 8 are photomicrographs of the microstructure of an alloy of the invention made with different sintering times.
Figure 5:
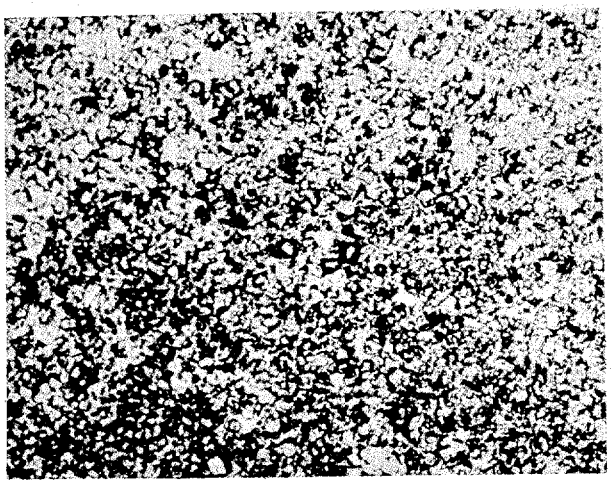
Figure 6:
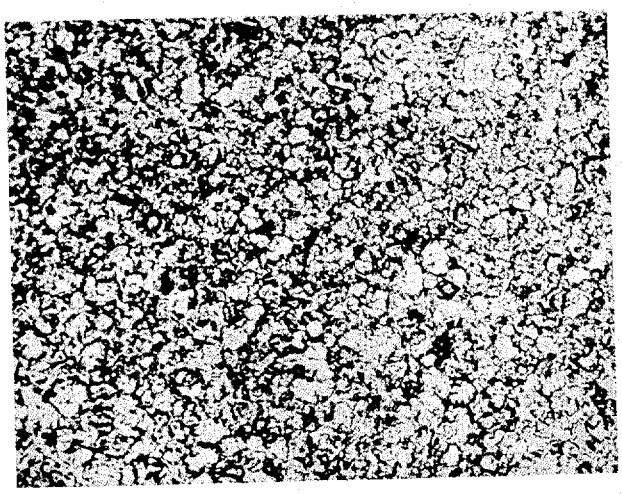
Figure 7:
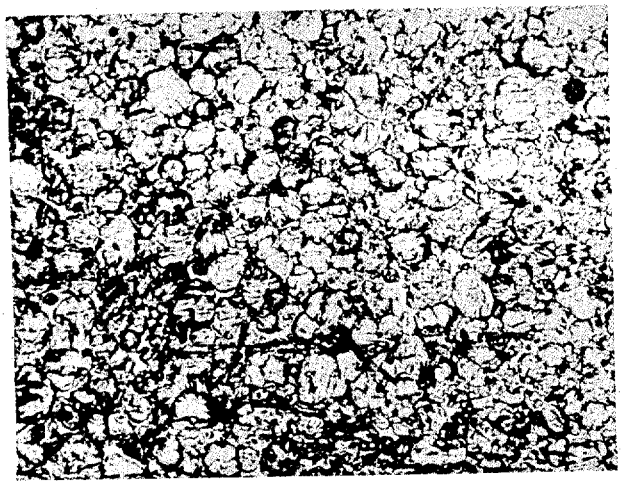
Figure 8:
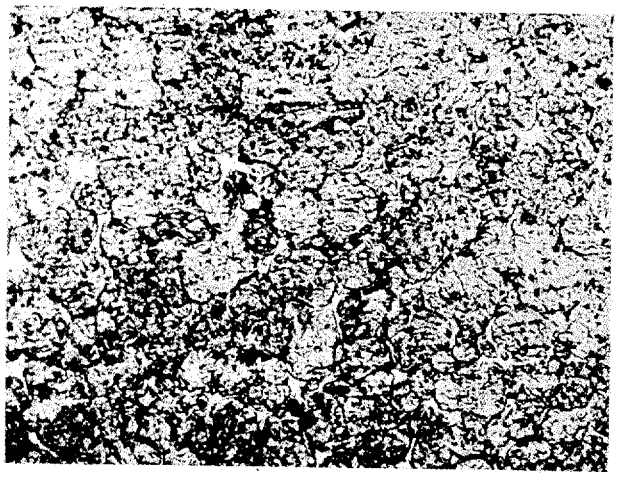

Fig. 3 is a graph illustrating some typical variations in ultimate tensile strength and percent elongation in one inch on standard specimens of four compositions as a function of sintering time at a sintering temperature of 1440° C. The sintered densities of the specimens used for the determination of mechanical properties plotted in the graph were all greater than 97% of the theoretical. The four compositions were the following:

| | W, percent | Ni+Cu, percent | Ni/Cu | Mo/Ni+Cu | Fe/Ni+Cu |
|---|---|---|---|---|---|
| 4C | 89.25 | 7.05 | 1.04 | 0.70 | 0 |
| 17D | 86.37 | 7.13 | 1.43 | 0.80 | 0.11 |
| 14D | 83.50 | 8.07 | 1.67 | 0.98 | 0.07 |
| EL | 72.15 | 19.63 | 1.30 | 0.27 | 0.15 |

COMPOSITIONS

The principles of the invention are applicable to the production of a very large number of high density materials having heretofore unobtainable high strength and other desirable properties. The following Table I lists some property data of typical sintered alloy compositions embodying the invention. The alloys are grouped according to sintering conditions and are arranged in the order of decreasing sintered density. Except as noted, the percentages or ratios of the alloy constituents are derived from intended compositions.

TABLE I

| Sample | W, Wt. Percent | Ni+Cu, Wt. Percent | [Ni/Cu] Ni/Cu | [Mo/Ni+Cu] Mo/Ni+Cu | [Fe/Ni+Cu] Fe/Ni+Cu | Sint. Density, gm./cc. | Simt. Temp., ° C. | Sint. Time, Min. | U.T.S., p.s.i. | Percent El. in 1" |
|---|---|---|---|---|---|---|---|---|---|---|
| 4C1 [1] | 89.25 | 7.05 | 1.04 | 0.70 | ---------- | 17.23 | 1,420 | 10 | 130,000 | 4.5 |
| 158D9 [1] | 91.50 | 5.16 | 1.02 | 0.35 | 0.30 | 17.23 | 1,420 | 10 | 126,500 | 6.0 |
| 16D2 [1] | 89.30 | 5.53 | 1.15 | 0.56 | 0.38 | 17.15 | 1,420 | 10 | 127,300 | 5.0 |
| 150D1 [1] | 89.70 | 5.47 | 0.91 | 0.49 | 0.40 | 17.14 | 1,420 | 10 | 155,000 | 2.5 |
| 149C6 [1] | 88.93 | 7.28 | 0.96 | 0.52 | ---------- | 17.13 | 1,420 | 10 | 154,000 | 3.0 |
| 13C1 [1] | 87.87 | 7.20 | 1.41 | 0.69 | ---------- | 17.08 | 1,420 | 10 | 120,000 | 2.0 |
| 10D1 [1] | 89.88 | 7.32 | 1.98 | 0.25 | 0.14 | 17.06 | 1,420 | 10 | 120,600 | 5.0 |
| 5D1 [1] | 90.41 | 4.08 | 1.29 | 0.75 | 0.60 | 17.06 | 1,420 | 10 | 133,300 | 3.5 |
| 17D1 [1] | 86.37 | 7.13 | 1.43 | 0.80 | 0.11 | 16.94 | 1,420 | 10 | 133,000 | 3.0 |
| 14D1 [1] | 83.50 | 8.07 | 1.67 | 0.98 | 0.07 | 16.55 | 1,420 | 10 | 146,000 | 2.0 |
| 8C1 [1] | 84.72 | 10.15 | 1.02 | 0.51 | ---------- | 16.38 | 1,420 | 10 | 141,000 | 2.5 |
| 11D1 [1] | 84.29 | 7.02 | 1.19 | 0.72 | 0.52 | 16.24 | 1,420 | 10 | 135,300 | 5.0 |
| EL4 | 72.15 | 19.63 | 1.30 | 0.27 | 0.15 | 14.48 | 1,420 | 10 | 138,100 | 8.0 |
| 32D1 | 85.00 | 10.00 | 1.50 | 0.30 | 0.20 | 16.17 | 1,410 | 12 | 128,200 | 5.0 |
| 28C2 | 85.00 | 10.00 | 1.50 | 0.50 | ---------- | 16.03 | 1,410 | 12 | 134,700 | 2.0 |
| 34D1 | 85.00 | 6.00 | 1.00 | 0.33 | 1.17 | 16.02 | 1,410 | 12 | 129,300 | 5.0 |
| 33D2 | 85.00 | 7.00 | 1.33 | 1.00 | 0.14 | 15.82 | 1,410 | 12 | 151,500 | 1.0 |
| 30C1 | 85.00 | 7.50 | 0.88 | 1.00 | ---------- | 15.65 | 1,410 | 12 | 144,500 | 0.5 |
| 35D1 | 83.00 | 8.00 | 0.60 | 1.00 | 0.12 | 15.56 | 1,410 | 12 | 146,400 | 0.5 |
| 30D2 | 80.00 | 10.00 | 1.50 | 0.50 | 0.50 | 15.48 | 1,410 | 12 | 139,500 | 9.8 |
| 27C2 | 80.00 | 15.00 | 1.00 | 0.33 | ---------- | 15.37 | 1,410 | 12 | 130,000 | 3.2 |
| 31C2 | 82.00 | 10.50 | 1.33 | 0.71 | ---------- | 15.34 | 1,410 | 12 | 139,500 | 0.2 |
| 31D2 | 80.00 | 9.00 | 1.00 | 1.00 | 0.22 | 15.30 | 1,410 | 12 | 151,600 | 2.0 |
| 29D1 | 80.00 | 9.00 | 1.00 | 0.22 | 1.00 | 15.20 | 1,410 | 12 | 121,200 | 7.8 |
| 25C2 | 80.00 | 10.00 | 1.50 | 1.00 | ---------- | 15.17 | 1,410 | 12 | 142,000 | 1.0 |
| 26C2 | 80.00 | 10.00 | 0.67 | 1.00 | ---------- | 15.05 | 1,410 | 12 | 142,500 | 0.8 |
| 21C1 | 75.00 | 12.50 | 1.78 | 1.00 | ---------- | 15.02 | 1,410 | 12 | 147,000 | 0.8 |
| 23C2 | 75.00 | 17.00 | 1.43 | 0.47 | ---------- | 14.92 | 1,410 | 12 | 149,000 | 3.5 |
| 19C2 | 75.00 | 20.00 | 1.50 | 0.25 | ---------- | 14.80 | 1,410 | 12 | 121,800 | 4.0 |
| 27D1 | 75.00 | 9.00 | 1.00 | 0.89 | 0.89 | 14.72 | 1,410 | 12 | 154,000 | 4.5 |
| 26D1 | 75.00 | 15.00 | 1.50 | 0.33 | 0.33 | 14.62 | 1,410 | 12 | 141,800 | 8.0 |
| 16C2 | 70.00 | 15.00 | 2.00 | 1.00 | ---------- | 14.58 | 1,410 | 12 | 158,500 | 2.5 |
| 14C2 | 70.00 | 20.00 | 1.50 | 0.50 | ---------- | 14.40 | 1,410 | 12 | 151,000 | 5.0 |
| 18C2 | 70.00 | 15.00 | 1.00 | 1.00 | ---------- | 14.33 | 1,410 | 12 | 143,000 | 2.0 |
| 22D1 | 72.00 | 19.70 | 1.29 | 0.27 | 0.15 | 14.25 | 1,410 | 12 | 133,400 | 6.1 |
| 18D2 | 70.00 | 20.00 | 1.50 | 0.40 | 0.10 | 14.21 | 1,410 | 12 | 147,500 | 7.5 |
| 1A2 | 91.00 | 7.20 | 1.00 | 0.25 | ---------- | 17.25 | 1,400 | 4 | 127,300 | 4.0 |
| 2A2 | 91.00 | 6.00 | 1.00 | 0.25 | 0.25 | 17.15 | 1,400 | 4 | 134,500 | 4.0 |
| 4B1 | 90.40 | 4.80 | 1.00 | 0.25 | 0.75 | 16.99 | 1,400 | 4 | 131,000 | 3.0 |
| 3B1 | 89.50 | 6.00 | 1.00 | 0.25 | 0.50 | 16.89 | 1,400 | 4 | 143,600 | 5.0 |
| 6A2 | 89.50 | 6.00 | 1.00 | 0.50 | 0.25 | 16.75 | 1,400 | 4 | 149,000 | 2.0 |
| 11A2 | 89.20 | 4.80 | 1.00 | 0.75 | 0.50 | 16.72 | 1,400 | 4 | 164,100 | 0.6 |
| 5A2 | 89.20 | 7.20 | 1.00 | 0.50 | ---------- | 16.71 | 1,400 | 4 | 144,200 | 1.0 |
| 12A1 | 88.00 | 4.80 | 1.00 | 0.75 | 0.75 | 16.65 | 1,400 | 4 | 161,500 | 0.8 |
| 10A4 | 90.40 | 4.80 | 1.00 | 0.75 | 0.25 | 16.99 | 1,400 | 8 | 142,300 | 1.9 |
| 8B4 | 89.20 | 4.80 | 1.00 | 0.50 | 0.75 | 16.80 | 1,400 | 8 | 138,500 | 2.8 |
| 9A3 | 87.40 | 7.20 | 1.00 | 0.75 | ---------- | 16.38 | 1,400 | 8 | 159,000 | 1.0 |

[1] Contents of the minor elements were determined by chemical analyses.

APPLICATIONS

The alloys of the invention are suitable for all applications where a high-density material having high strength and good machining properties is required. Thus, in view of their extremely high strength, they are especially advantageous as gyroscope rotors, as they can be spun at rotational speeds exceeding by as much as 50% to 100% the highest rotational speeds that were heretofore obtainable with conventional high density materials without developing a permanent set beyond the tolerable maximum. For such applications, the alloy listed under 6–A–2 in Table I has been found to be particularly useful. The composition of this alloy is:

| | Percent |
|---|---|
| W | 89.5±1.00 |
| Ni | 3.0±0.25 |
| Cu | 3.0±0.25 |
| Mo | 3.0±0.25 |
| Fe | 1.5±0.25 |

Table II is a comparison of the average properties of alloy 6–A–2 of the invention and those of one of the best conventional heavy alloys sold on the market, composed of 90% W, 6% Ni and 4% Cu:

TABLE II

| | 90W-6Ni-4Cu | 6-A-2 |
|---|---|---|
| Density, gm./cc | 16.71–16.96 | 16.70–16.95. |
| Hardness, Rc | 24–28 | 30–34. |
| Endurance limit, p.s.i. | 40,000 | 55,000. |
| Electrical conductivity, percent I.A.C.S. | 14 | 14. |
| Thermal conductivity, cal./cm.²/cm./sec./° C. | 0.225 | 0.235. |
| Coefficient of expansion (25–900° C.) [in./in., ° C.] *in./in./° C.* | $6.00\times10^{-6}$ | $5.88\times10^{-6}$. |
| Modulus of rupture, p.s.i. | 220,000 | 230,000. |
| Ultimate compressive strength, p.s.i. | 162,000 | 171,400. |
| Compressive yield strength, p.s.i. | 92,000 | 119,800. |
| Ultimate tensile strength, p.s.i. | 112,000 | 135,000. |
| Tensile yield strength, p.s.i. | 75,000 | 114,000. |
| Percent elongation in one inch. | 2 (Min.) | 2 (Min.). |
| Proportional limit, p.s.i. | 25,000 | 62,000. |
| Modulus of elasticity, p.s.i. | 40,000,000 | 44,000,000. |
| High temperature tensile strength, p.s.i. | 70,000 (300° C.)<br>55,000 (450° C.) | 98,600 (300° C.).<br>84,000 (500° C.). |
| Temperature limit for good oxidation resistance, ° C. | 400 | 450. |

From the foregoing table, the superiority of the alloy of the invention is clearly apparent.

MICROSTRUCTURE

Figs. 4 to 8 are micrographs for alloy 17D, shown in Table I, sintered at 1400° C. for 4, 8, 15, 30 and 60 minutes, respectively. All of these micrographs have been taken at a magnification of 500 diameters, using $K_3Fe(CN)_6$ as the etchant.

Figure 9:
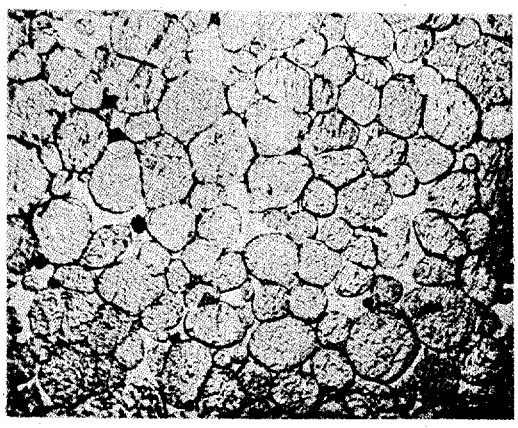
Fig. 9 is a similar photomicrograph of the microstructure of a conventional high-density tungsten base alloy.

Fig. 9 is a micrograph taken at the same magnification and made by using the same etchant, of one of the best conventional heavy alloys (90% W, 6% Ni, 4% Cu), sintered under conditions (16 minutes at 1400° C.), which were found to be the most satisfactory for an alloy of this type.

The most significant changes that can be observed in Figs. 4 to 8 are the change in grain size with sintering time. However, unlike the conventional W-Ni-Cu alloys exemplified by Fig. 9, the properties of which do not appreciably change as a function of grain size, the alloys of the invention exhibit a high degree of correlation between properties and sintering time, therefore, grain size. (See the graph shown in Fig. 3.) In the microstructure of the alloys of the invention, the visible grains are W, Mo, and high W and high Mo phases. The material between grains is the matrix, which is believed to be Ni-Cu base containing W, Mo, and Fe at short sintering (small grain size), and Ni-Cu base containing mostly Fe and very small amounts of W and Mo at long time sintering (large grain size).

Although the present invention has been disclosed in connection with preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. A sintered high-density alloy prepared by pressing and sintering particles of the constituents having an average size between 2 and 6 microns, said alloy consisting essentially of at least 65% by weight of tungsten, with nickel and copper in such amounts that their combined weight constitutes 4% to 25% of the weight of the composition and their weight ratio is between 0.5 and 2.5, and molybdenum in an amount from [0.4] *0.1* to 1.5 times the combined weight of the nickel and copper.

2. A sintered high-density alloy prepared by pressing and sintering particles of the constituents having an average particle size less than 8 microns, said alloy consisting essentially of at least 65% by weight of tungsten, with nickel and copper in such amounts that their combined weight constitutes 4% to 25% of the weight of the composition and their weight ratio is between 0.5 and 2.5, molybdenum in an amount from [0.4] *0.1* to 1.5 times the combined weight of the nickel and copper, and iron in an amount up to 1.5 times the combined weight of the nickel and copper but not exceeding 10% by weight of the composition.

3. A high-density high-strength sintered alloy compact prepared by pressing and sintering of at least partially prealloyed particles of the constituent metals initially having an average particle size not in excess of 8 microns, said compact being essentially composed of at least 65% by weight of tungsten, with nickel and copper in such amounts that their combined weight constitutes 4% to 25% of the weight of the compact and their weight ratio is between 0.5 and 2.5, and molybdenum in an amount from [0.4] *0.1* to 1.5 times the combined weight of the nickel and copper, said compact being characterized by a sintered density at least 93% of a theoretical density of not less than 13.5 gm./cc. and an ultimate tensile strength substantially higher than 112,000 p.s.i.

4. A high-density high-strength sintered alloy compact prepared by pressing and sintering of partially prealloyed particles of the constituent metals initially having an average particle size between 2 and 6 microns, said compact being essentially composed of at least 65% by weight of tungsten, with nickel and copper in such amounts that their combined weight constitutes 4% to 25% of the weight of the compact and their weight ratio is between 0.5 and 2.5, molybdenum in an amount from [0.4] *0.1* to 1.5 times the combined weight of the nickel and copper, and iron in an amount up to 1.5 times the combined weight of the nickel and copper but not exceeding 10% by weight of the alloy, said compact being characterized by a sintered density at least 93% of a theoretical density of not less than 13.5 gm./cc. and an ultimate tensile strength substantially higher than 112,000 p.s.i.

5. A sintered high-density high-strength tungsten base alloy particularly suitable for high speed rotor applications prepared by pressing and sintering of partially prealloyed particles of the constitutent metals initially having an average particle size not in excess of 8 microns, said alloy being essentially composed of about 88.5% to 90.5% tungsten, about 2.75% to about 3.25% nickel, about 2.75% to about 3.25% copper, about 2.75% to about 3.25% molybdenum, and about 1.25% to about 1.75% iron constituting the balance, said alloy being characterized by a sintered density at least 93% of a theoretical density of not less than 13.5 gm./cc. and an ultimate tensile strength substantially higher than 112,000 p.s.i.

References Cited in the file of this patent or the original patent

UNITED STATES PATENTS

| | | |
|---|---|---|
| 1,229,960 | Humphries | Jan. 12, 1917 |
| 1,453,057 | Williams | Apr. 24, 1923 |
| 1,829,635 | Davey | Oct. 27, 1931 |
| 2,206,537 | Price | July 2, 1940 |
| 2,491,866 | Kurtz et al. | Dec. 20, 1949 |
| 2,620,555 | Lenz | Dec. 9, 1952 |

FOREIGN PATENTS

| | | |
|---|---|---|
| 517,442 | Great Britain | Jan. 30, 1940 |
| 746,212 | Great Britain | Mar. 14, 1956 |